Jan. 16, 1962  F. R. WOODWARD  3,017,495
LIMITED OVERLAP TRAVEL-TYPE SERIES STRIP WELDER
Filed Sept. 11, 1959  4 Sheets-Sheet 1
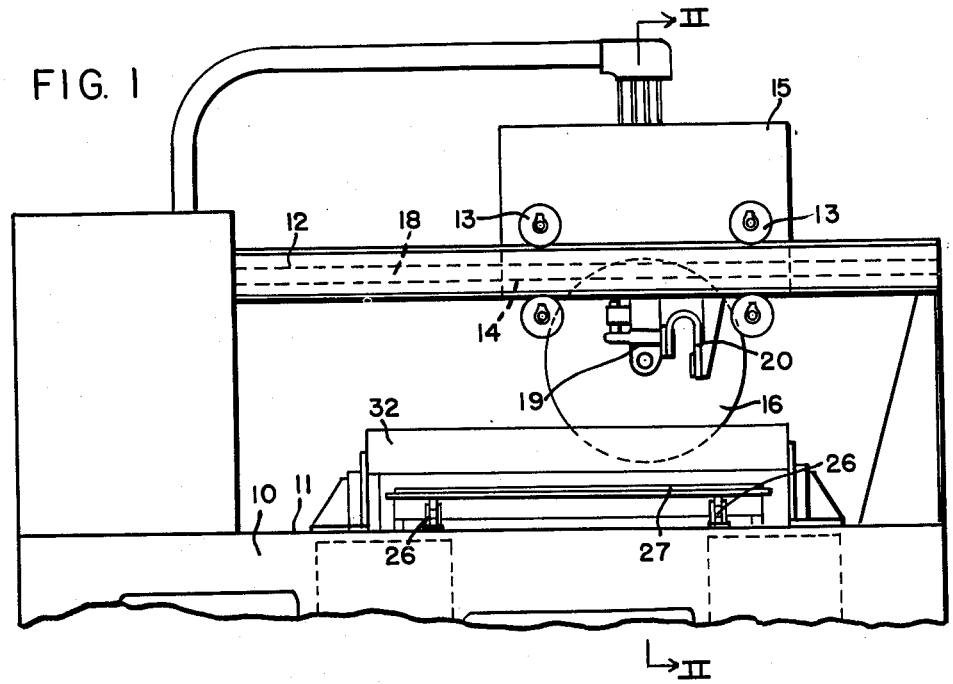
FIG. 1
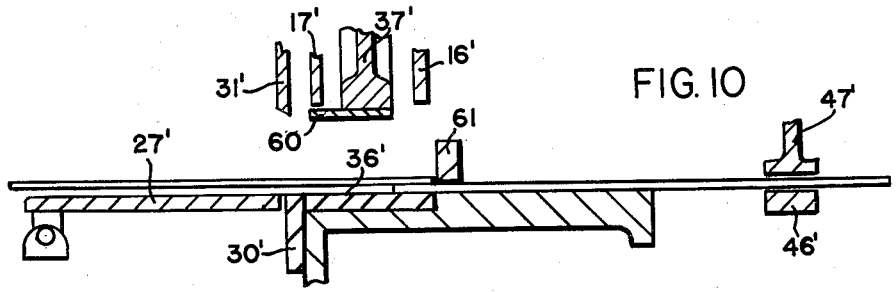
FIG. 10
FIG. 11
INVENTOR
FOSTER R. WOODWARD
BY 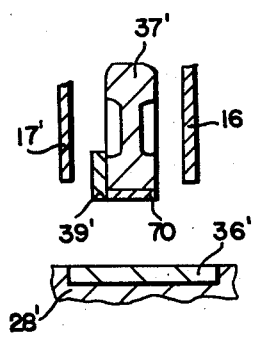
ATTORNEY Jan. 16, 1962 F. R. WOODWARD 3,017,495
LIMITED OVERLAP TRAVEL-TYPE SERIES STRIP WELDER
Filed Sept. 11, 1959 4 Sheets-Sheet 2

INVENTOR
FOSTER R. WOODWARD
BY *Francis J. Klempay*
ATTORNEY

Jan. 16, 1962   F. R. WOODWARD   3,017,495
LIMITED OVERLAP TRAVEL-TYPE SERIES STRIP WELDER
Filed Sept. 11, 1959   4 Sheets-Sheet 3

INVENTOR
FOSTER R. WOODWARD
BY *Francis J. Klempay*
ATTORNEY

Jan. 16, 1962  F. R. WOODWARD  3,017,495
LIMITED OVERLAP TRAVEL-TYPE SERIES STRIP WELDER
Filed Sept. 11, 1959  4 Sheets-Sheet 4

INVENTOR
FOSTER R. WOODWARD
BY *Francis J. Klempay*
ATTORNEY

United States Patent Office 3,017,495
Patented Jan. 16, 1962

3,017,495
LIMITED OVERLAP TRAVEL-TYPE SERIES
STRIP WELDER
Foster R. Woodward, Warren, Ohio, assignor to The Taylor-Winfield Corporation, Warren, Ohio, a corporation of Ohio
Filed Sept. 11, 1959, Ser. No. 839,364
9 Claims. (Cl. 219—82)

The present invention relates generally to the welding art and more particularly to electric resistance travel-type series strip welders which are adapted to join leading and trailing ends of coils of metal strip or other like workpieces, for example.

As will be understood by those skilled in the art, welding apparatus is used for joining the successive leading and trailing ends of metal strip and one type of such apparatus which has found wide employment is a traveling series strip welder. In this type of welder a pair of longitudinally spaced welding electrode wheels are mounted for rolling movement across the overlapped strip ends being joined to complete two longitudinally spaced and transversely extending lines of weld. The welding electrode wheels are each electrically connected to one secondary terminal of a welding transformer and welding current is caused to flow in series from the welding transformer, through the welding electrode wheels, along a suitable welding platen and vertically through the overlapped strip ends at longitudinally spaced points. Although, as mentioned above, this type of welding apparatus is widely employed for the purposes stated the results obtained therefrom are not completely acceptable in all cases. Such a welder is not suited for use in a continuous processing line wherein the additional stiffness imparted to the welded strip by the relatively large overlap is objectionable. Due to the necessity of a centrally disposed weld clamp and the physical requirements of the apparatus the welding electrode wheels are usually spaced from each other approximately five inches and the strip ends are overlapped by a length of approximately six inches.

Further, in a travel-type series seam welder a short circuit shunting current flows across the top strip end of the overlapped strip ends and such shunting current does not contribute to the welding thereof. This shunting current requires that the electrical apparatus of the welder have a greater capacity than would otherwise be necessary and is particularly objectionable when low resistance materials are being joined, such as aluminum, copper, or their alloys, for example.

While the above limitations have somewhat curtailed the utilization and employment of travel-type series strip welders, such welders are highly desirable and advantageous from an electrical and mechanical design and cost standpoint. The series secondary circuit comprising the welding electrode wheels, the overlapped strip ends and the welding platen provides a small inductance loop and the electrical power demand of the welder is quite low. Also, the mechanical design of such a welder is highly simplified whereby the same is characterized by its low cost, ease of manufacture and assembly and compactness.

It is the primary object of the present invention to provide travel-type series strip welding apparatus which embodies all of the advantages inherent in similar prior art welders but yet eliminates the disadvantages associated therewith. The travel-type series strip welder of the present invention may be advantageously employed where prior art apparatus of the same character could not be used.

Another object of the present invention is to provide travel-type series strip welding apparatus wherein the sometimes objectionable and rather large overlap of the strip ends may be eliminated. As will be hereinafter more fully apparent, the strip ends are overlapped only a limited distance—three-quarters of an inch, for example—and welding is completed only along one line extending transversely across the overlapped strip ends.

Still another object of the invention is to provide travel-type series strip welding apparatus wherein the short circuit shunting current may be completely eliminated. Such welding apparatus is adapted for welding materials having low electrical resistance.

A further object of the invention is to provide travel-type series strip welding apparatus wherein deterioration and wear of the welding electrode wheels is minimized. In certain embodiments of the present invention a copper pad is provided for one of the electrode wheels to roll on during actual welding operations whereby this electrode wheel is subjected to a minimum of wear.

The above, as well as other objects and advantages, will become more fully apparent upon consideration of the following specification and accompanying drawing wherein there are disclosed certain preferred embodiments of the invention.

In the drawing:

FIGURE 1 is an end elevational view of a limited overlap travel-type series strip welder embodying the teachings of the present invention;

FIGURES 9 and 10 are side sectional views depicting the positioning of the component parts of still another embodiment of the invention at successive stages in a welding operation; and FIGURE 11 is a fragmentary side sectional view corresponding to FIGURE 2 showing a further modification of the apparatus of the present invention.

Figure 2:
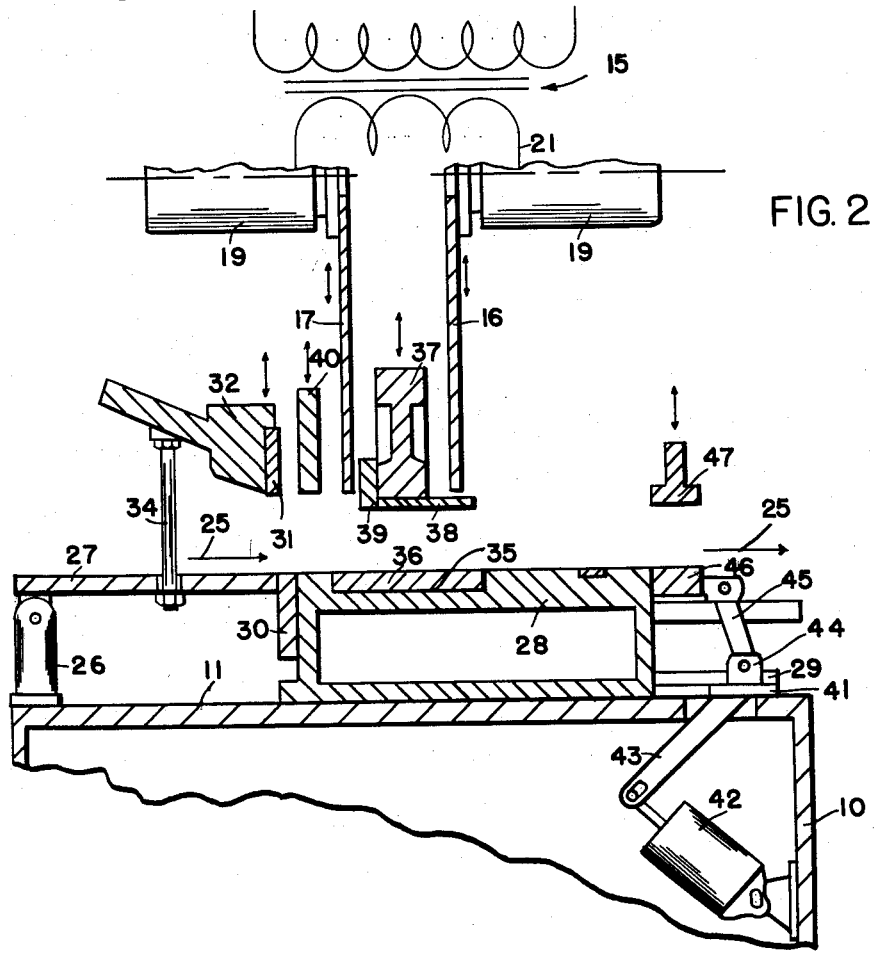
FIGURE 2 is a side sectional view taken along the section line 11—11 of FIGURE 1 showing the various component parts of the travel-type series strip welding apparatus as positioned prior to actual welding operations.

Referring now to the drawing, and initially to FIGURES 1–5 thereof, there is shown a limited overlap travel-type series strip welder, which, in accordance with usual practice, comprises a housing 10 defining a flat upper surface 11 upon which various component parts of the welder are mounted. Disposed vertically above the surface 11 are a pair of transversely extending and longitudinally spaced rails 12 whose upper and lower edges are engaged by suitable pairs of grooved rollers 13. The rollers 13 are mounted from a welder carriage 14 which carries a welding transformer 15 and mounts a pair of longitudinally spaced large diameter welding electrode wheels 16 and 17. A transversely extending threaded shaft 18 extends between the rails 12 and is drivingly connected with the welder carriage 14. When the threaded shaft 18 is rotated by power means, not particularly shown, the welder carriage 14 and the welding electrode wheels 16 and 17 will be caused to move transversely across the normal path of strip travel.

Each of the welding electrode wheels is journaled for rotation in a spindle housing 19 which is electrically connected through a band of flexible conductors 20 to one secondary terminal 21 of the welding transformer 15. Each of the welding electrode wheels is mounted for vertical movement by a fluid weld cylinder, not shown, which is adapted to retract the welding electrode wheel from pressure engagement with the strip ends and to apply the force necessary for completing the welding operation.

Mounted on the surface 11 in the direction of strip travel which is represented by the arrows 25 are spaced clevises 26 which pivotally mount one end of a shear table 27, a generally rectangular hollow platen support 28 and a pair of transversely spaced and longitudinally extending guides or ways 29. The rear end of the platen support 28 has rigidly attached thereto a lower shear blade 30 which is adapted to cooperate with an upper shear blade 31 attached to a shear carrier 32. Suitable power means, not shown, are provided for effecting vertical movement of the shear carrier 32 and upper shear blade 31 whereby the upper shear blade 31 may be moved vertically through a shearing stroke to shear or crop the extreme end portion of the trailing strip end. The shear carrier 32 is rigidly interconnected with the shear table 27 by means of rods 34 so that the shear table 27 is pivoted downwardly when the upper shear blade 31 moves downwardly.

The upper surface of the platen support 28 has a rectangular depression 35 therein and received within this depression is a generally rectangular and transversely extending welding platen 36. The welding platen 36 is made of highly current conductive material, such as copper or one of its alloys, and provides a current conductive bridge for welding current flowing through the strip ends and between the welding electrode wheels 16 and 17.

Disposed between the welding electrode wheels 16 and 17 is a welding clamp 37 which is adapted to be moved vertically by means, not shown, into tight clamping relation with respect to the trailing strip end and the welding platen 35. Attached to the lower face of the welding clamp 37 is a current conductive plate or shoe 38 which, as is clearly shown in the drawing, extends beneath the forward welding electrode wheel 16. Attached to the rear of the welding clamp 37 is a transversely extending gauge bar 39 whose rear face is accurately machined to provide a gauging or stopping surface for the extreme forward end of the leading strip end. Disposed between the rear welding electrode wheel 17 and upper shear blade 31 is a vertically movable leading strip end clamp 40 which is adapted to be lowered in clamping relation with the leading strip end.

The longitudinally extending and transversely spaced guides 29 slidably guide a plate 41 for longitudinal movement upon proper energization of a fluid indexing cylinder 42 pivotally mounted within the housing 10. The piston rod of the indexing cylinder 42 is pivotally connected to a drive link 43 which is in turn attached to the plate 41. Mounted on the plate 41 are clevises 44 that pivotally receive one end of links 45 whose other ends are pivotally attached to a lower platen 46 of a longitudinally movable trailing strip end clamp. The trailing strip end clamp further comprises a vertically movable upper platen 47 which is carried from the lower platen 46 and the arrangement is such that when a trailing strip end is clamped between the platens 46 and 47 the indexing cylinder 42 may be energized to index the clamped trailing strip end longitudinally.

Figure 3:
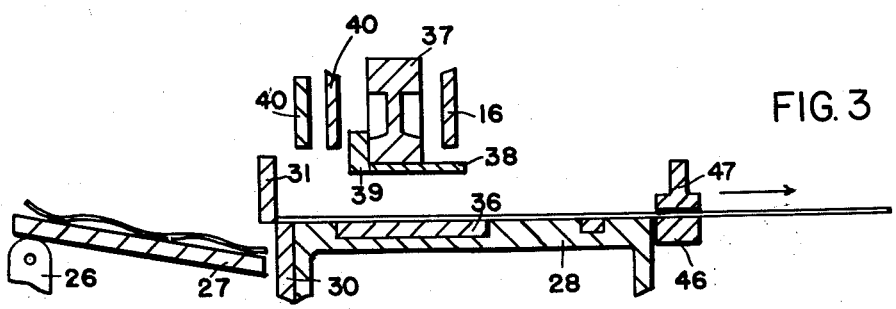
FIGURES 3, 4 and 5 are fragmentary side sectional views corresponding to FIGURE 2 showing the positioning of the component parts of the travel-type series strip welding apparatus at successive times during a welding operation.

Considering now the operation of the strip welding apparatus above described, the component parts of the apparatus are initially positioned as shown in FIGURE 2 with the strip traveling through the welder. As the trailing strip end approaches the welder it is stopped and the upper platen 47 of the trailing strip end clamp is lowered to firmly clamp the trailing strip end. At this time the extreme end portion of the trailing strip end overhangs or extends rearwardly beyond the lower shear blade 30. Then, as shown in FIGURE 3 and while the trailing strip end is still clamped by the trailing strip end clamp, the upper shear blade 31 is moved vertically through a shearing stroke whereby the extreme rear end of the trailing strip end is cropped. The indexing cylinder 42 is now properly energized whereby the clamped trailing strip end is indexed forward a predetermined distance so that the extreme rear end of a trailing strip end is now disposed a very slight distance to the rear of the rear welding electrode wheel 17. This indexing movement is, of course, accurately controlled and may be adjusted by means of stops or the like.

Figure 4:
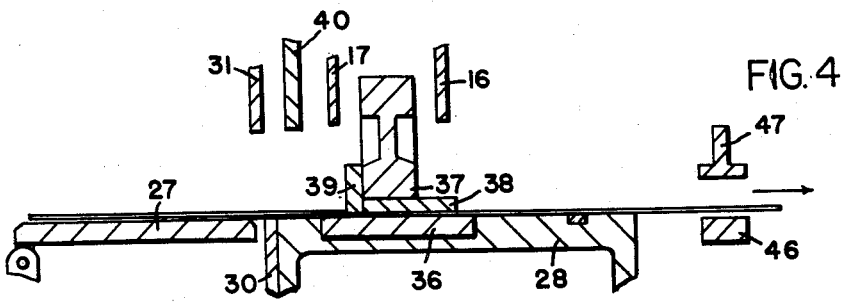
Figure 5:
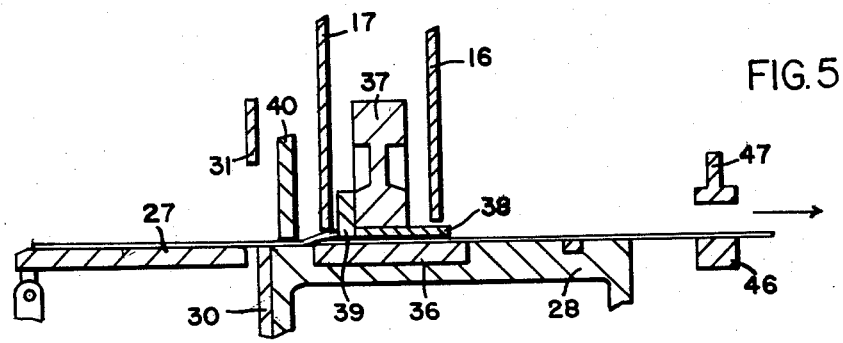

With the trailing strip end so positioned the welding clamp 37 is now lowered into clamping relation with the trailing strip end and the welding platen 36. At this time the platens 47 and 46 of the trailing strip end clamp may be separated and this clamp returned to its original starting position. After the cropping from the trailing strip end has been removed by the operation, the leading strip end, which may have been previously squared in an external shear, not shown, is advanced into the welder until its extreme forward end engages and abuts against the rear or gauging surface of the gauge bar 39. As shown in FIGURE 4 the leading strip end overlaps the trailing strip end by a relatively short or limited distance and the trailing strip end is firmly clamped between the welding clamp 37 and the welding platen 36.

Then the leading strip end clamp 40 is lowered into clamping engagement with the leading strip end and at this time both the leading and trailing strip ends are clamped at points closely adjacent the overlap. The welding electrode wheels 16 and 17 are lowered so that the welding electrode wheel 17 engages the overlapped strip ends while the welding electrode wheel 16 engages and bears against the forwardly extending portion of the current conductive plate or shoe 38.

Welding current is supplied to the welding electrode wheels 16 and 17 by the welding transformer 15 in such a manner that current flows from the contact electrode wheel 16 vertically through the current conductive plate or shoe 38, through the trailing strip end, longitudinally along the welding platen 36, vertically through the overlapped trailing and leading strip ends and then to the welding electrode wheel 17. Only one line of weld will be completed as the electrode wheels 16 and 17 are moved transversely across the normal path of strip travel. This line of weld will occur where the trailing and leading strip ends are overlapped. The electrode wheel 16 does not weld the strip ends but merely serves as a conductor for completing the series secondary electrical circuit of the welder. The small or limited overlap eliminates the objection to prior art apparatus of this type which provides a very large overlap and the resulting undesirable stiffness in the welded strip.

It will be noted that all of welding current supplied to the electrode wheels is employed in welding the strip ends and that short circuit shunting currents are eliminated. The elimination of short circuit shunting currents allows a reduction in the electrical capacity of the welder and further, allows series seam welders to be advantageously employed in the welding of low resistance materials. The electrode wheel 16 bears against and rolls across the current conductive shoe 38 and this shoe minimizes the wear on the electrode wheel 16. The electrode wheel 16 is not subjected to deterioration and wear as would be the comparable welding electrode wheel on prior art apparatus. The limited overlap travel-type strip welder of the present invention retains all the advantages of prior art series strip welders—including a small inductance secondary loop and the resulting low electrical power demand—but eliminates the substantial objections thereto for certain uses.

Figure 6:
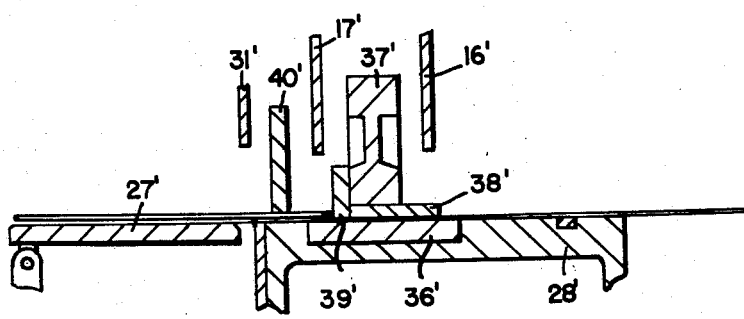
FIGURE 6 is a fragmentary side sectional view showing a second embodiment of a limited overlap travel-type series strip welder of the present invention.

In FIGURE 6 of the drawing there is shown another embodiment of the invention. This embodiment is the same as the embodiment shown in FIGURES 1–5 with the exception that the longitudinally movable trailing strip end clamp is not employed. All other component parts are the same and to avoid unnecessary repetition in the specification similar component parts of this and the other embodiments of the invention will be designated by primed reference numerals. In some operations a longer overlap can be tolerated and it is unnecessary to provide means for indexing the trailing strip end forwardly. The extreme rear end of the trailing strip end will remain positioned at a point adjacent the lower shear blade 30' and the amount of overlap will be somewhat longer than that provided in the embodiment shown in FIGURES 1–5 since no means are provided for longitudinally indexing the trailing strip end. In all other respects the operation of the apparatus shown is exactly the same as that disclosed in connection with FIGURES 1–5 of the drawing.

Figure 7:
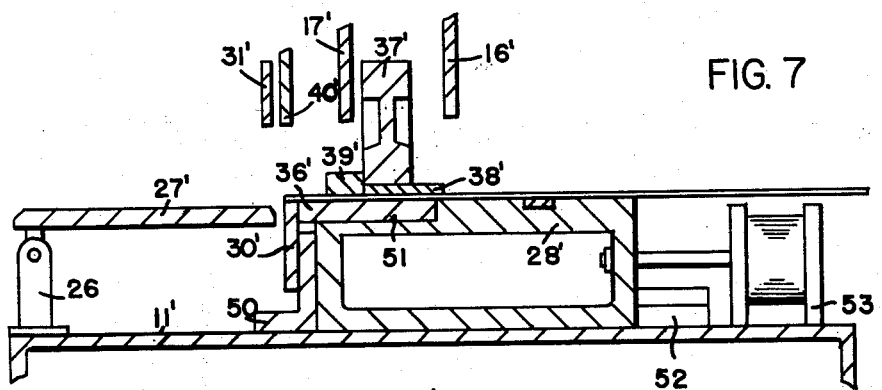
FIGURES 7 and 8 are fragmentary side sectional views showing the disposition of the various component parts of a further embodiment of the present invention during different stages of a welding operation.
Figure 8:
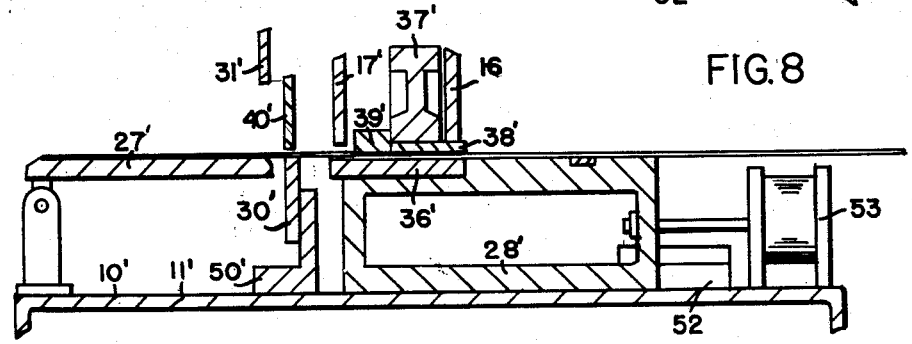

In FIGURES 7 and 8 of the drawing there is shown an embodiment wherein the longitudinal indexing of the trailing strip end is accomplished in a slightly different manner than that disclosed in connection with FIGURES 1–5. It will be noted that the lower shear blade 30' is attached to a shear blade support 50 rather than being mounted from the generally rectangular platen support 28'. The platen support 28' has a depression 51 therein adjacent its rear end and mounted in this depression is the welding platen 36'. A pair of transversely spaced longitudinally extending guides or ways 52 are mounted on the surface 11 and are adapted to guide the platen support 28' for longitudinal movement. The platen support 28' is attached to the piston rod of a fluid cylinder 53 which is mounted from the supporting base 11. The welding clamp 37' is also interconnected and longitudinally movable with the platen support 28'. When the platen support 28' and the welding clamp 37' are in their initial or starting position the gauge bar 39' is disposed beneath the welding electrode wheel 17' and the shoe 38' does not extend beneath the welding electrode wheel 16'. The forward surface of the shear mounting bracket 50 and the lower shear blade 30' form an abutment stop to accurately limit the rearward movement of the welding platen 36', welding clamp 37' and the platen support 28'.

To begin a welding operation the trailing strip end is stopped in the welder with the extreme end portion projecting rearwardly beyond the lower shear blade 30'. The welding clamp 37' is now lowered into tight clamping relation with respect to the trailing strip end and the welding platen 36'. The upper shear blade 31' is moved vertically through a shearing cycle to shear the extreme end of the trailing strip end. With the trailing strip end thus sheared and still firmly clamped by the welding clamp 37' the fluid cylinder 53 is energized to move the platen support 28', the clamped trailing strip end, the welding platen 36', the welding shoe 38' and the gauge bar 39' forwardly in a longitudinal direction for a predetermined distance. This distance may be adjusted by the provision of suitable stops, not shown, and is such that the extreme rear end on the trailing strip end will now be positioned beneath the welding electrode wheel 17'. This indexing movement is also operative to move the forwardly projecting portion of the shoe 38' to a position below the electrode wheel 16' and to move the gauge bar 39' from beneath the welding electrode wheel 17'. After this indexing movement has been accomplished and the shear cropping removed, a leading strip end is moved forwardly until its extreme forward end abuts against the rear gauging surface of the gauge bar 39' and slightly overlaps the clamped trailing strip end. Then the leading strip end clamp 40' is lowered into clamping engagement with the leading strip end and the lower shear blade 30'. The lower shear blade 30' serves not only as a means for shearing the trailing strip end but also as a means for clamping the leading strip end.

With the leading and trailing strip ends so overlapped and clamped the electrode wheels are lowered. The welding wheel 17' engages the overlapped strip ends while the contact wheel 16' engages the current conductive shoe 38'. Welding current is supplied to the electrode wheels 16' and 17' as the same are moved transversely across the normal path of strip travel and a single line of weld is provided adjacent the welding electrode wheel 17'. After the strip ends are welded the electrode wheels 16' and 17', the welding clamp 37' and leading strip end clamp 40' are vertically retracted. The welded strips are free to move through the welder and the cylinder 53 is energized to return the platen support 28', welding clamp 37' and welding platen 36' to their initial starting positions. The rear surfaces of the lower shear blade 30' and the shear blade support 50 provide a positive abutment stop for limiting rearward movement of these members whereby the same are very accurately positioned for the succeeding welding operation.

Figure 9:
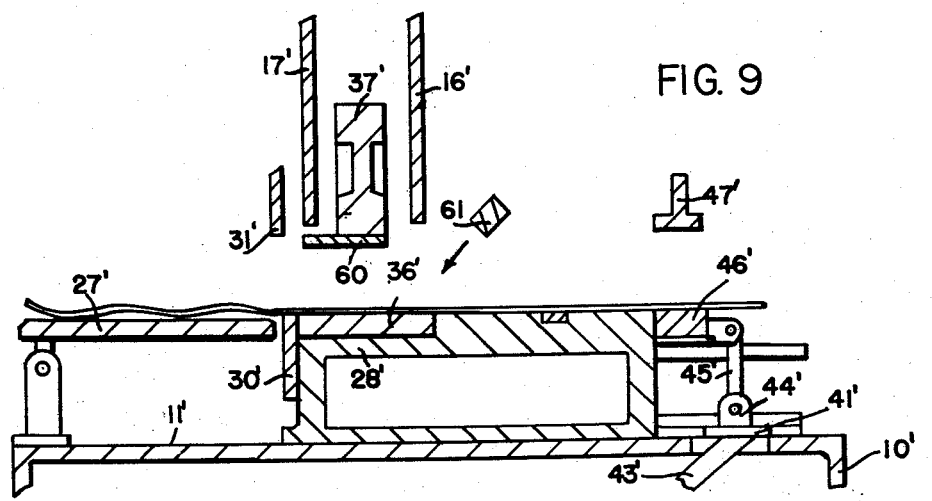

Referring now to FIGURES 9 and 10 of the drawing, there is shown a further embodiment of the invention wherein the forward welding electrode wheel 16' is employed as the operative welding electrode wheel while the electrode wheel 17' is used as a conductor to complete the secondary welding circuit. A current conductive plate or shoe 60 is mounted on the welding clamp 37' and this shoe extends rearwardly beneath the rear welding electrode wheel 17'. A gauge bar attached to the rear face of the welding clamp 37' is not employed but rather a vertically pivotal gauge bar 61 is disposed forwardly of the forward welding electrode wheel 16' and rearwardly of the trailing strip end clamp.

In the use of this apparatus the trailing strip end is first stopped in the welder with the extreme end portion thereof overhanging the lower shear blade 30'. Then the upper clamping platen 47' of the trailing strip end clamp is lowered to firmly clamp the trailing strip end. The upper shear blade 31' now moves through a shearing stroke to crop the trailing strip end and the trailing strip end clamp is moved forwardly in a longitudinal direction until the extreme end of the trailing strip end is positioned beneath the welding electrode wheel 16'. Then the gauge bar 61 is pivoted downwardly into tight engagement with the trailing strip end and after the shear cropping has been removed a leading strip end is moved into the welder until its extreme forward end abuts against the accurately machined rear gauging surface of the gauge bar 61. Welding clamp 37' is now lowered into clamping engagement with the leading strip end and it will be noted that at this time the leading and trailing strip ends are properly overlapped and clamped prior to actual welding operations.

To complete the welding of the strip ends the welding electrode wheel 16' is lowered into engagement therewith while the electrode wheel 17' is lowered into engagement with the current conductive shoe 60. Welding current is supplied to the electrode wheels and the same are moved transversely with respect to the normal path of strip travel whereby a single line of weld is completed transversely across the overlapped strip ends. At the end of weld all component parts are retracted and the strip is free to move through the welder. The longitudinally movable trailing strip end clamp is now returned to its starting position and the welder is again prepared for another strip joining operation.

In the embodiment shown in FIGURES 9 and 10 of the drawing the overlap of the strip ends, in accordance with the teachings of the present invention, is limited to a relatively small distance. It will be noted that short circuit shunting current will flow through the leading strip end which will not assist in the welding of the overlapped strip ends. This embodiment of the invention may be employed on materials having reasonably high electrical resistance where the short circuit shunting current is not objectionable and it is desired to make only one line of weld while still retaining a series secondary electrical circuit.

In FIGURE 11 of the drawing the welding clamp 37' is shown provided with a current conductive shoe or plate 70 which does not extend forwardly or rearwardly of the welding clamps but is, in fact, longitudinally coextensive therewith. This construction does not provide an extension on which the electrode wheel serving as a conductor to complete the series secondary circuit is adapted to roll. This modification may be included in any of the above described embodiments without affecting the welding operation in any manner. However, the use of the shoe 70 which does not have an extension will increase the deterioration of the electrode wheel serving as a means for completing the series secondary circuit. In addition, the shoe 70—or any of the shoes 38, 38' or 60—may be completely removed without adversely affecting the welding operation.

It will thus be seen that I have accomplished the objects initially set forth. There has been disclosed limited overlap travel-type series strip welding apparatus which embodies on the inherent advantage of similar prior art machines but yet eliminates the disadvantages thereof. Of particular importance is the elimination of short circuit shunting currents and/or the provision of a relatively small or limited overlapping of the strip ends.

Although I have shown and described certain illustrated embodiments of the invention it should be understood that many changes may be made therein without departing from the clear teachings thereof. Accordingly, reference should be had to the following appended claims in determining the true scope and intent of the invention.

I claim:

1. Welding apparatus of the type having a series secondary electrical circuit for joining the successive ends of metal strips and the like comprising a pair of longitudinally spaced welding electrode wheels, each of said weld-wheels, means to overlap the strip ends adjacent only one secondary terminal of a welding transformer, a transversely extending welding platen bridging said welding electrode wheels, means to move said welding electrode wheels transversely with respect to the normal path of strip travel, a vertically movable weld clamp positioned between said longitudinally spaced welding electrode wheels, means to overlap the strip ends adjacent only one of said welding electrode wheels whereby said one of said welding electrode wheels engages the overlap of said strip ends, said welding electrode wheels completing a single line of weld across said overlap upon energization of said means to move, said other of said welding electrode wheels serving as a conductor for completing said series secondary electrical circuit, a current conductive shoe carried by said welding clamp and extending longitudinally into the plane of said other of said welding electrode wheels, and said shoe providing a surface on which said other of said welding electrode wheels is adapted to roll during welding.

2. Apparatus according to claim 1 further characterized in that said means to overlap comprises a gauge bar carried by said welding clamp, and said gauge bar providing a gauging surface adjacent said one of said welding electrode wheels.

3. Welding apparatus of the type having a series secondary electrical circuit for joining the successive ends of metal strips and the like which comprises a pair of longitudinally spaced welding electrode wheels, means to supply welding current to said welding electrode wheels, means to effect relative transverse movement between said welding electrode wheels and said strip ends, means to overlap said strip ends adjacent only one of said welding electrode wheels, said one of said welding electrode wheels engaging the overlap of said strip ends, a current conductive shoe overlying a portion of a strip end and extending into the plane of the other electrode wheel, the other of said welding electrode wheels engaging only said shoe, said welding electrode wheels completing a single line of weld across said overlap when said relative transverse movement is effected, and said other of said welding electrode wheels serving as a conductor for completing said series secondary electrical circuit.

4. Welding apparatus of the type having a series secondary electrical circuit for joining the successive ends of workpieces and the like which comprises a pair of longtitudinally spaced welding electrodes, means to supply welding current to said welding electrodes, means to overlap said workpieces adjacent only one of said welding electrodes, said one of said welding electrodes engaging the overlap of said workpieces and the other of said welding electrodes engaging only one of said workpieces, and said other of said welding electrodes serving as a conductor for completing said series secondary electrical circuit, shearing means adjacent the entry end of the apparatus for shearing one of said workpieces, means to clamp said one of said workpieces for shearing, and means to move said means to clamp longitudinally whereby the sheared end of said one of said workpieces is positioned closely adjacent one of said welding electrodes.

5. Apparatus according to claim 4 further characterized in that said means to clamp comprise a welding clamp disposed between said longitudinally said spaced welding electrodes.

6. Welding apparatus of the type having a series secondary electrical circuit for joining the successive ends of metal strips and the like which comprises a pair of longitudinally spaced welding electrodes, means to supply current to said welding electrodes, means to shear one of said strip ends adjacent the entry side of said welding apparatus, means to clamp said one of said strip ends, and means to move said clamp longitudinally to position said one of said strip ends adjacent one of said welding electrodes.

7. Apparatus according to claim 6 further characterized in that said means to clamp comprises a welding clamp disposed between said pair of longitudinally spaced welding electrodes, a platen support, said platen support mounting a current conductive welding platen, said welding clamp being adapted to clamp one of said strip ends against said welding platen, and said means to move comprising means to longitudinally shift said platen support.

8. Apparatus according to claim 6 further comprising a second means to clamp disposed at the entry side of said welding apparatus, said means to shear comprising a pair of cooperating shear blades, and one of said shear blades defining one of the clamping platens for said second means to clamp.

9. Apparatus according to claim 6 further characterized in that said means to clamp has a gauging surface thereon, said gauging surface being disposed adjacent one of said welding wheel electrodes, and said means to clamp further comprising a longitudinally extending current conductive shoe against which the other of said welding electrodes is adapted to bear.

References Cited in the file of this patent
UNITED STATES PATENTS

| | | |
|---|---|---|
| 1,172,301 | Murray et al. | Feb. 22, 1916 |
| 2,412,648 | Rendel | Dec. 17, 1946 |